US006880390B2

(12) United States Patent
Emord (10) Patent No.: US 6,880,390 B2
(45) Date of Patent: Apr. 19, 2005

(54) FUEL METER FOR OUTBOARD ENGINES

(75) Inventor: Nicholas J. Emord, Hingham, MA (US)

(73) Assignee: Bell Sea Marine Systems, Hingham, MA (US)

( * ) Notice: Subject to any disclaimer, the term of this patent is extended or adjusted under 35 U.S.C. 154(b) by 0 days.

(21) Appl. No.: 10/289,631

(22) Filed: Nov. 7, 2002

(65) Prior Publication Data

US 2003/0114977 A1 Jun. 19, 2003

Related U.S. Application Data

(60) Provisional application No. 60/345,155, filed on Nov. 7, 2001.

(51) Int. Cl.[7] ............................................. G01M 15/00
(52) U.S. Cl. ....................................................... 73/113
(58) Field of Search ........................... 73/112, 113, 114, 73/116, 117.2, 117.3, 118.1, 119 A, 119 R (56) References Cited

U.S. PATENT DOCUMENTS

| | | | |
|---|---|---|---|
| 3,949,602 A | 4/1976 | Erwin, Jr. ..................... 73/114 |
| 4,043,198 A | 8/1977 | Stillwell et al. ............... 73/242 |
| 4,061,023 A | 12/1977 | Kuno et al. .................... 73/114 |
| 4,061,024 A | 12/1977 | Erwin, Jr. ..................... 73/114 |
| 4,073,186 A | 2/1978 | Erwin, Jr. ..................... 73/114 |
| 4,079,623 A | 3/1978 | Erwin, Jr. ..................... 73/113 |
| 4,085,610 A | 4/1978 | Erwin, Jr. ..................... 73/113 |
| 4,092,850 A | 6/1978 | Erwin, Jr. ..................... 73/113 |
| 4,107,992 A | 8/1978 | Bateman et al. ............... 73/260 |
| 4,129,034 A | 12/1978 | Niles et al. ................. 73/117.3 |
| 4,250,748 A | 2/1981 | Wallqvist ...................... 73/247 |
| 4,296,472 A | 10/1981 | Sarkis ......................... 364/509 |
| 4,479,465 A | 10/1984 | Flynn ......................... 123/514 |
| 4,590,796 A | 5/1986 | Baatz .......................... 73/113 |
| 4,596,216 A | 6/1986 | Speed ......................... 123/357 |
| 4,969,365 A | 11/1990 | Strigard et al. ........... 73/861.77 |
| 5,445,018 A | 8/1995 | Harpster .................... 73/118.2 |
| 5,785,562 A | 7/1998 | Nestvall ........................ 440/1 |
| 5,895,844 A | 4/1999 | Krueger ....................... 73/119 |
| 5,938,124 A | 8/1999 | Lowi, Jr. .................. 239/533.2 |
| 6,158,289 A | 12/2000 | Taylor et al. ............. 73/861.27 |
| 6,203,558 B1 | 3/2001 | Dusbabek et al. ........... 606/198 |
| 6,301,958 B1 * | 10/2001 | Grabher et al. ............ 73/118.1 |
| 6,397,668 B1 * | 6/2002 | Davison et al. ............... 73/113 |
| 6,453,731 B1 * | 9/2002 | Yaegashi ...................... 73/113 |
| 6,691,025 B1 * | 2/2004 | Reimer ........................ 701/123 |

* cited by examiner

*Primary Examiner*—Eric S. McCall
(74) *Attorney, Agent, or Firm*—Mills & Onello, LLP (57) ABSTRACT

An apparatus and method for determining a parameter related to fuel consumption in an engine are disclosed. An electrical sensor senses an electrical control signal used to control fuel introduced into the engine, such as by controlling a valve or fuel injector of the engine. The electrical sensor generates a measurement signal that is indicative of an electrical parameter such as frequency or voltage of the electrical control signal. A processor receives the measurement signal and uses the measurement signal to determine the parameter related to fuel consumption. The parameter can be volume of fuel consumed, fuel consumption rate, fuel efficiency or other related parameter.

42 Claims, 4 Drawing Sheets

FUEL METER FOR OUTBOARD ENGINES

RELATED APPLICATIONS

This application is based on U.S. Provisional Patent Application No. 60/345,155, filed on Nov. 7, 2001, the contents of which are incorporated herein in their entirety by reference.

BACKGROUND OF THE INVENTION

The outboard engine has undergone substantial changes in recent years. The outboard has for decades functioned as a two-cycle motor. Today, while the two cycle motors remain the standard, the use of fuel injection and computer control has become commonplace. Additionally, four-stroke outboard motors have been introduced in recent years, which also incorporate fuel injection.

The outboard engine has utilized carburetors of various forms for the mixture of fuel and air for introduction to a combustion chamber. With this method of presenting fuel for combustion, traditional technology emerged for measuring the amount of fuel consumed by the outboard engine. The technology incorporates measurement by means of a fuel meter. The device is located along a fuel line that connects the fuel supply tank and the outboard motor. This meter is used to determine the volume and rate of fuel consumed by the outboard engine.

The fuel meter commonly incorporates a mechanism such as an impeller. The fuel's motion, mass and volume move the impeller. Measurement of the impeller movement is correlated to an amount and rate of fuel consumed. Fuel meters have also incorporated an optical metering device to provide the fuel measurement. With such a device, fuel flows from the fuel supply tank to the outboard engine across an optical sensor, which obtains an optical measurement of the flow of fuel. This measurement is correlated to a fuel amount and rate of consumption.

Such fuel measurement devices are considered invasive because the measuring device being used is installed within the flow of fuel between the fuel supply tank and the engine. Such a device is disclosed in U.S. Pat. No. 4,590,796. As a result, the flow of fuel can be adversely affected by the measuring device. That is, with the introduction of one of these conventional fuel flow measuring devices, an uninterrupted flow of fuel from the supply tank to the engine cannot be obtained. This can have a negative impact on such characteristics as precision fuel measurement and fuel flow deprivation.

Other fuel measuring means, such as those of the type disclosed in U.S. Pat. No. 5,895,844, utilize multiple sensors that are modified to fit directly to and become part of the fuel injector. This means uses two physical sensors to invasively measure the physical position of the injectors' mechanical components.

Other fuel meters, such as those of the type disclosed in U.S. Pat. No. 4,596,216, measure fuel by measuring engine rotations per minute (RPM). In such systems, measurements of fuel rate and other fuel consumption parameters are dependent upon engine RPM.

SUMMARY OF THE INVENTION

The invention is directed to a fuel meter and measuring method which overcome these drawbacks of the prior art. That is, the invention is directed to a non-invasive technique for measuring fuel consumption and other parameters without having a negative impact on performance of the engine.

The invention is directed to a fuel meter and a method for determining a parameter related to fuel consumption in an engine, such as an outboard engine in a boat. An electrical control signal used to control fuel introduced into the engine is sensed. A measurement signal indicative of an electrical parameter of the electrical control signal is generated. A processor receives the measurement signal and uses the measurement signal to determine the parameter related to fuel consumption in the engine.

In one embodiment, the electrical control signal is sensed by an electrical sensor. The electrical sensor can be inductively coupled to a line carrying the electrical control signal. Alternatively, the electrical sensor can be conductively coupled to the line carrying the electrical signal. In one embodiment, the electrical parameter of the electrical control signal indicated by the measurement signal is voltage of the control signal. In one embodiment, the parameter is frequency of the control signal.

In one embodiment, the control signal controls a valve of the engine. In one embodiment, the control signal controls a fuel injector of the engine. The volume of the fuel injector can also be used in determining the parameter related to fuel consumption in the engine.

The meter and method of the invention can be used to determine one or more parameters related to fuel consumption in the engine. For example, the parameter can be the volume of fuel consumed, the rate of fuel consumption and/or the fuel efficiency.

In accordance with the invention, the fuel flow measurement is made independent of any measurement of engine RPM.

The engine can be an outboard engine such as an engine on a water craft such as a boat. The boat can include a velocity meter for determining velocity of the boat. A global positioning satellite system (GPS) can also be used to determine velocity of the boat. The velocity of the boat can also be used in determining the parameter related to fuel consumption in the engine.

In the present invention, because an electrical control signal in the engine is sensed, the fuel flow measurement is non-invasive, that is, there is no equipment introduced into the fuel flow path to effect the measurement. As a result, the measurement does not interfere with or negatively affect the operation of the engine. A highly accurate fuel flow measurement can therefore be obtained.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
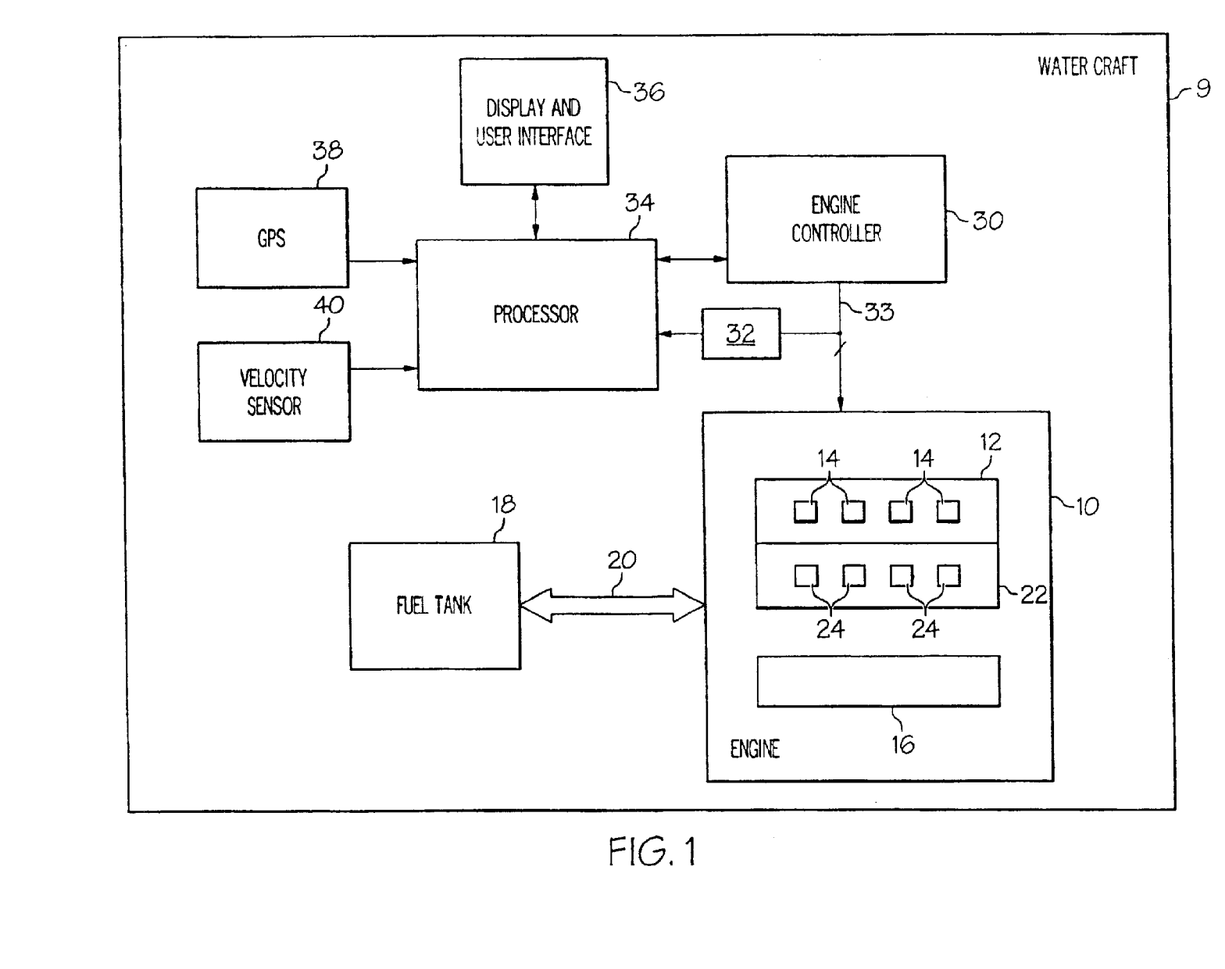
FIG. 1 is a functional block diagram illustrating one embodiment of the invention.

FIG. 1 is a functional block diagram illustrating one embodiment of the invention. In this embodiment, the engine 10 to which the invention is applied is used to propel a water craft such as a boat 9. The engine 10 receives fuel from a fuel reservoir or tank 18 via a fuel line 20. The engine 10 includes a fuel injection system 12 for receiving the fuel and distributing the fuel via one or more fuel injectors 14 to a combustion system 22, which includes one or more combustion chambers or cylinders 24 in the engine 10. The engine 10 also includes other components generally referred to by reference numeral 16.

In one embodiment, the engine 10 includes or is interfaced to a engine controller 30, which electronically controls the functions of the engine 10. One function of the engine controller 30 is to transmit control signals to the fuel injection system 12 to control electromechanical fuel injectors 14. The engine controller 30 generates a pulse signal for each injector 14 to control the introduction of fuel into the engine. The pulse signal is typically a series of electrical pulses characterized by a fixed and/or variable voltage or amplitude, frequency and pulse duration. The pulses can be of a square, triangular or any other waveform. When a pulse is in an active state, its corresponding injector 14 is activated to introduce fuel into its corresponding cylinder. The control signals are carried on one or more electrical lines 33 from the engine controller 30 to the fuel injection system 12.

In one embodiment of the invention, the system can include an electrical sensor 32, which can be inductively coupled to the line 33. In another embodiment, the sensor 32 can be directly connected to the line, that is, it can be conductively coupled to the line. The electrical sensor 32 senses amplitude or voltage and frequency of the pulse signals transmitted to the fuel injectors 14 by the engine controller 30 and generates a measurement signal indicative of the sensed pulse control signals.

A processor 34 determines the parameter related to fuel consumption in accordance with the invention. In one embodiment, the processor 34 receives the measurement signal from the sensor and uses the measurement signal in determining the parameter. In another embodiment, the processor 34 is directly coupled to the engine controller 30 and is aware of the issuance of the pulse control signals by the controller 30. In either case, the processor 34 in accordance with the invention receives information with regard to the amplitude or voltage and/or the frequency of the pulse control signals. It should be noted that the processor 34 can be a separate processor or can be an integral part of the engine controller 30.

The processor 34 interfaces to a display and user interface 36. The display provides the user or boat operator with the fuel consumption information determined by the invention. The user interface allows the user to alter the configuration of the system, provide input parameters used by the processor to determine the fuel consumption information, select information to be presented on the display and the format of the display, and provide other user-determined information and commands.

The processor 34 also optionally receives inputs related to speed of the boat 9. In one embodiment, a velocity sensor 40 provides the speed information. In another embodiment, a global position satellite (GPS) receiver 38 is used in known fashion to provide the speed of the boat 9. The speed of the boat can then be used by the processor 34 to compute the parameter related to fuel consumption.

The following describes the detailed computations performed by the invention to compute the fuel consumption parameters determined in accordance with the invention.

In one embodiment, the invention uses a capture sensor to measure the voltage amplitude, and frequency applied to a fuel injector or injectors. This capture sensor is attached in proximity to the fuel injector, or injectors, providing fuel to the combustion chamber. An electronic, electromechanical or mechanical device manipulates the fuel injector, or injectors. This device is integral to the outboard engine itself. The fuel injector supplies an amount of fuel to the combustion chamber. This amount is proportional to the amplitude and frequency of voltage applied to the fuel injector.

The fuel injector has a maximum volume of fuel it can contain. A control device, integral to the outboard motor, determines the amount of fuel the injector introduces to the combustion chamber.

The invention determines the volume of fuel the outboard engine consumes. This is defined as Fuel Consumption (FC). This is determined by first measuring amplitude and frequency of voltage applied to the fuel injector or injectors. These measurements are then scaled with values specific to each type of outboard engine. The result is manipulated by a value related to the number of cylinders in the outboard motor as well as a value related to the control configuration of the outboard motor. This is defined as Total Fuel Consumption (TFC). This result is then related to a time interval to determine the rate at which fuel is consumed. This is defined as Total Fuel Rate (TFR)

Additionally, in one embodiment, the invention utilizes the speed of the boat as it moves to determine Fuel Efficiency (FE). Speed information is collected from a device that can determine the speed of the outboard motor with relation to the fixed earth. As describe above, the device can be a speed sensor and/or a GPS receiving system. This value is commonly known as Speed Over Ground (SOG). The SOG is factored with the Total Fuel Rate (TFR) to determine the volume of fuel consumed with respect to the distance the outboard moves, thus defining Fuel Efficiency (FE).

With the presentation of Fuel Consumption, Fuel Rate and Fuel Efficiency, the operator whose vessel incorporates the outboard engine or engines can determine the effects of their selected throttle position, motor trim position, trim tabs position, vessel load weight and load location have on fuel usage.

The following parameters related to fuel consumption are computed by the invention in accordance with the following equations.

Fuel Consumption (FC)=(cylinder to injector parameter×constant A)×(fuel injector volume)×(constant $I$)×(voltage frequency×constant $B$)×(voltage amplitude×constant $C$)  (1)

Total Fuel Consumption (TFC)=FC×number of cylinders  (2)

Or:

Total Fuel Consumption (TFC)=sum of FC for all cylinders  (3)

Total Fuel Rate (TFR)=TFC/((Time differential)×Constant $D$)  (4)

$$\text{Fuel Efficiency}\,(FE) = \text{Total Fuel Rate}/\text{distance moved with respect to time}$$
$$= TFR/SOG \times (\text{Constant } E)$$
(5)

In the above equations the computation of Fuel Consumption is declared. In equation (1) the first product of values, Cylinder to Injector Parameter and Constant A are declared. The Cylinder to Injector Parameter represents a value dependent on the outboard engine's fuel injection configuration. The first configuration employs a single fuel injector pump. This single pump supports each fuel injector. Each fuel injector supports its own individual engine cylinder. The second configuration is one of multiple fuel injector pumps. Each pump supports its own unique fuel injector. In this configuration, each fuel injector and pump combination supports an individual cylinder. The value of Constant A is dependent on the number of cylinders in the engine, and the fuel pump-injector configuration of the engine.

In equation (1) the second product of values, Fuel Injector Volume and Constant I are declared. Fuel Injector Volume is a volumetric value dependent upon the maximum volume of fluid that can be supported by an individual fuel injector. Constant I is a non-dimensional value dependent on the fuel injectors, incorporated by the outboard engine, being of equal volumetric number.

In equation (1) the third product of values, Voltage Frequency and Constant B are declared. Voltage Frequency is a measured value. This value is a representation of the frequency of voltage applied to the fuel injector or injectors by the outboard engine control system. The frequency represents the number and duration of "pulses" per unit of time during which the fuel injector or injectors introduce a volume of fuel into the associated combustion chamber. Constant B represents a value defined by the configuration of the fuel injector and outboard engine control system.

In equation (1) the fourth product of values, Voltage Amplitude and Constant C are declared. Voltage Amplitude is a measured value. This value is a representation of the amount of voltage applied to the fuel injector or injectors. The amplitude characteristics relate to a specific volume of fuel which the fuel injector or injectors introduce to the associated combustion chamber. Constant C represents a value defined by the voltage amplitude characteristics applied to the fuel injector by the outboard engine control system. This value is such that when the voltage amplitude characteristics applied to the fuel injector by the outboard engine control system is such as to introduce to the combustion chamber a maximum amount of fuel volume, the product of Voltage Amplitude and Constant C is equal to unity.

In equation (1) Fuel Consumption (FC) is defined as the product of the first, second, third and fourth products of values.

In equation (2), Total Fuel Consumption (TFC) is declared. Where the configuration of the outboard engine control system is such as to apply a consistent volume of fuel to each cylinder over a discrete operating range of the engine, the Total Fuel Consumption (TFC) is the product of the number of cylinders in the engine and the Fuel Consumption (FC) as defined in equation (1).

In equation (3), where the configuration of the outboard engine control system is such as to apply a variable volume of fuel to each cylinder, the Total Fuel Consumption is the sum of Fuel Consumptions (FC) as defined in equation (1), for each cylinder in the engine.

Equation (4) defines Total Fuel Rate (TFR) as the Total Fuel Consumption (TFC), as defined in equations (2) or (3), divided by the product of Time differential with Constant D. Time differential is defined as the difference between the end and start of a time interval. The value of constant D is such as to provide the appropriate system units to the computation.

Equation (5) defines the Value of Fuel Efficiency as the quotient of Total Fuel Rate (TFR) and the measured value Speed Over Ground (SOG), then multiplied by a Constant E. The value SOG is measured by a means, such as a velocity meter or GPS receiver system, capable of determining the movement of the motor with reference to the fixed earth. The value of constant E is such as to provide the appropriate system units to the computation.

In one embodiment, the volume of an injector is known. A full-length pulse of the control signal would introduce the maximum amount of fuel for that cycle. A measurement of pulse duration therefore indicates the amount of fuel introduced during a cycle. A measurement of a percentage of a full pulse width indicates introduction of fuel during the cycle in an amount proportional to the maximum amount of fuel for a cycle related to the percentage of a full pulse width. Referring to equation (1), the measurement of voltage frequency indicates duration or width of a pulse.

Figure 2:
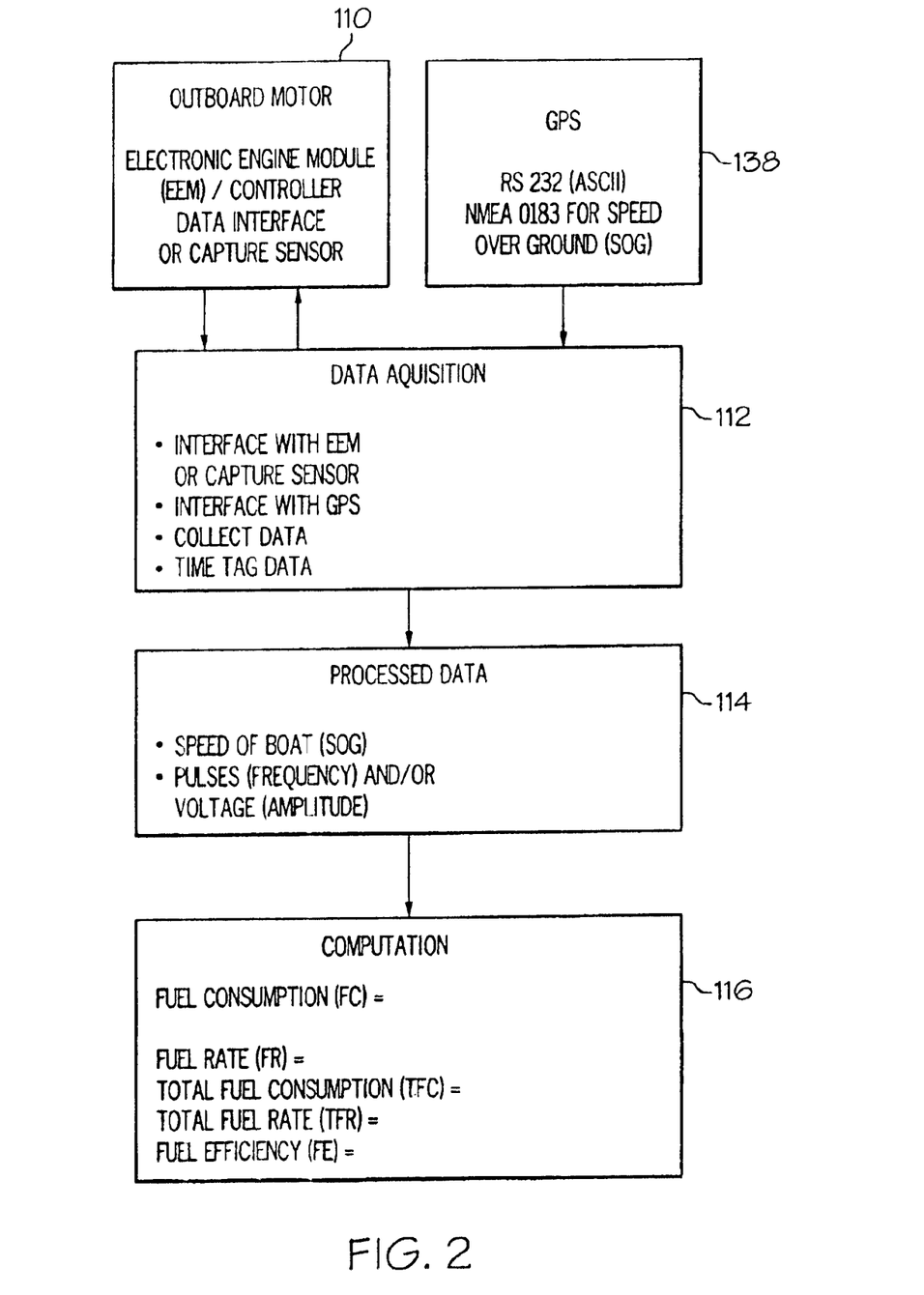
FIG. 2 contains a schematic functional block diagram illustrating the architecture and functional processes of one embodiment of a system in accordance with the invention.

FIG. 2 contains a schematic functional block diagram illustrating the architecture and functional processes of one embodiment of a system in accordance with the invention for computing parameters related to fuel consumption in an engine, such as an outboard engine on a boat. The system includes an outboard engine or motor 110, which includes an electronic engine module (EEM) or controller. The EEM includes a data interface for receiving information related to the control signal used to control the fuel injectors. Alternatively, or in addition to the data interface, the EEM can interface to a sensor which detects the control signal as it is forwarded from the controller to the fuel injection system. The capture sensor detects, for example, voltage and/or pulse rate of the control signal.

A GPS receiving system 138 uses a data interface to provide data related to the speed of the boat over the ground (SOG). The EEM and GPS 138 interface with a data acquisition module 112, which receives and processes the EEM data or capture sensor data. It also collects and processes GPS data and applies time tags to the data. The acquired data is then forwarded to a processed data module 114. The data received by the module 114 can include speed of boat (SOG), control pulse frequency and control pulse voltage and/or amplitude. The processed data is then forwarded to a computation module 116 which performs the computations described above in accordance with the invention.

Figure 3:
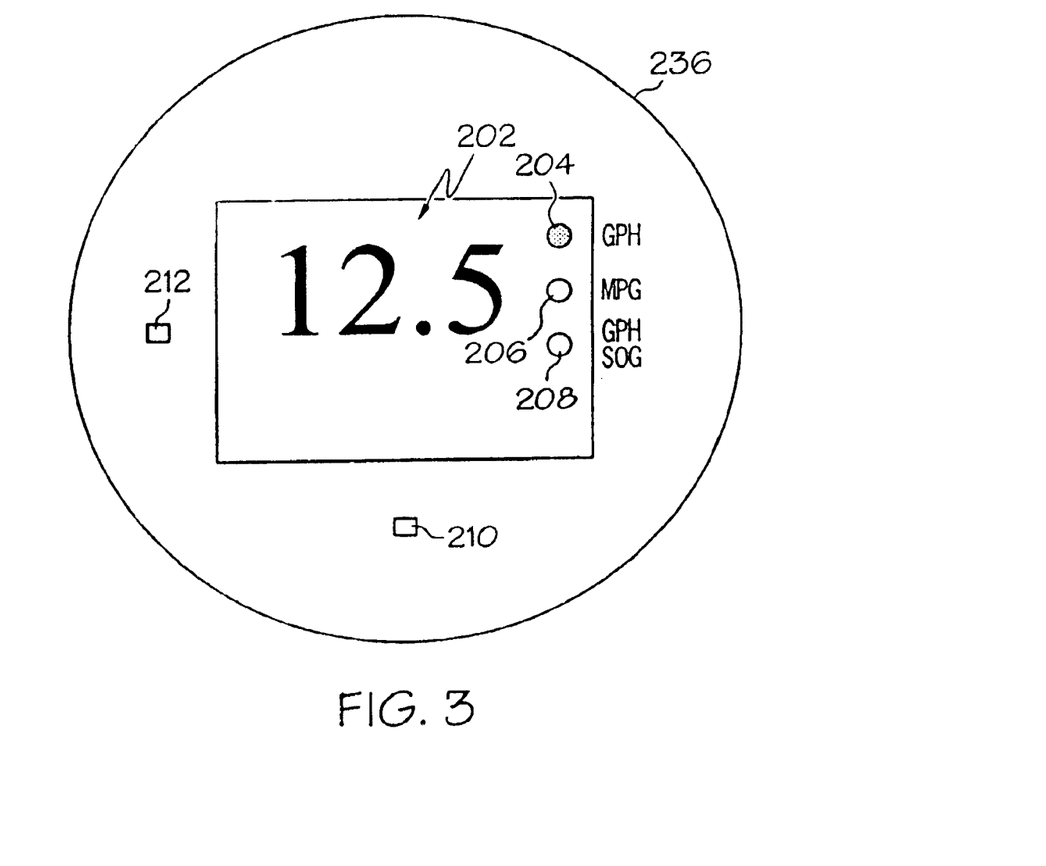
FIG. 3 contains a schematic plan view of one embodiment of a display used to display to the user the information generated in accordance with the invention.

FIG. 3 contains a schematic plan view of one embodiment of a display 236 used to display to the user the information generated in accordance with the invention. The display can be flush mounted to the boat dashboard or bracket mounted in the boat. In one embodiment, the display contains a digital readout 202 for presenting numerical information to the user. The display 236 also includes LEDs 204, 206 and 208 used to indicate the meaning of the displayed information. For example, when LED 204 is activated, the displayed information is rate of fuel consumption in gallons per hour (GPH). When LED 206 is active, the displayed information is fuel rate in miles per gallon (MPG). When LED 208 is active, the displayed information is GPH and speed over ground (SOG). The display 236 also provides a user interface in the form of push buttons 210 and 212. The user can change the information on the display by depressing the buttons 210 and 212 in various predetermined sequences, each of which is associated with a particular item of information presentable on the display.

The various operating modes and display information can be selected by the user manipulating the buttons 210 and 212. The two buttons 210 and 212 are configured as a select button and a change button. The buttons allow the user to scroll through display modes using the change button and, in combination with the select button, allow the user to select modes of operation and information to be displayed. For example, some of the information that can be displayed and/or modes that can be selected via the buttons are:

Gallons per Hour (GPH), Miles per Gallon (MPG)
Gallons per Mile (GPM)
GPH and Speed over Ground (SOG)
Total Distance Traveled (miles)
Present Speed
Average Speed (MPH), Average Miles per Gallon
Trip Fuel Consumed, Total Fuel Consumed
Trip Distance
Trip Average Speed, Total Average Speed
Standard Engine Selection
Custom Engine Selection
Fuel Injector ID (1 . . . N Injectors)
Fuel Injector Volume (1 . . . N Injectors)
Available Running Time at Present Speed (Hours)
Fuel Available (Gallons)
Fuel Tank Capacity (Gallons)
Present Fuel in Tank (Gallons)
Fuel Added to Tank (Gallons)
Fuel Removed from Tank (Gallons)
Select Units (Metric, English)

Each of these modes or items of display information can be selected using the buttons on the display.

Figure 4:
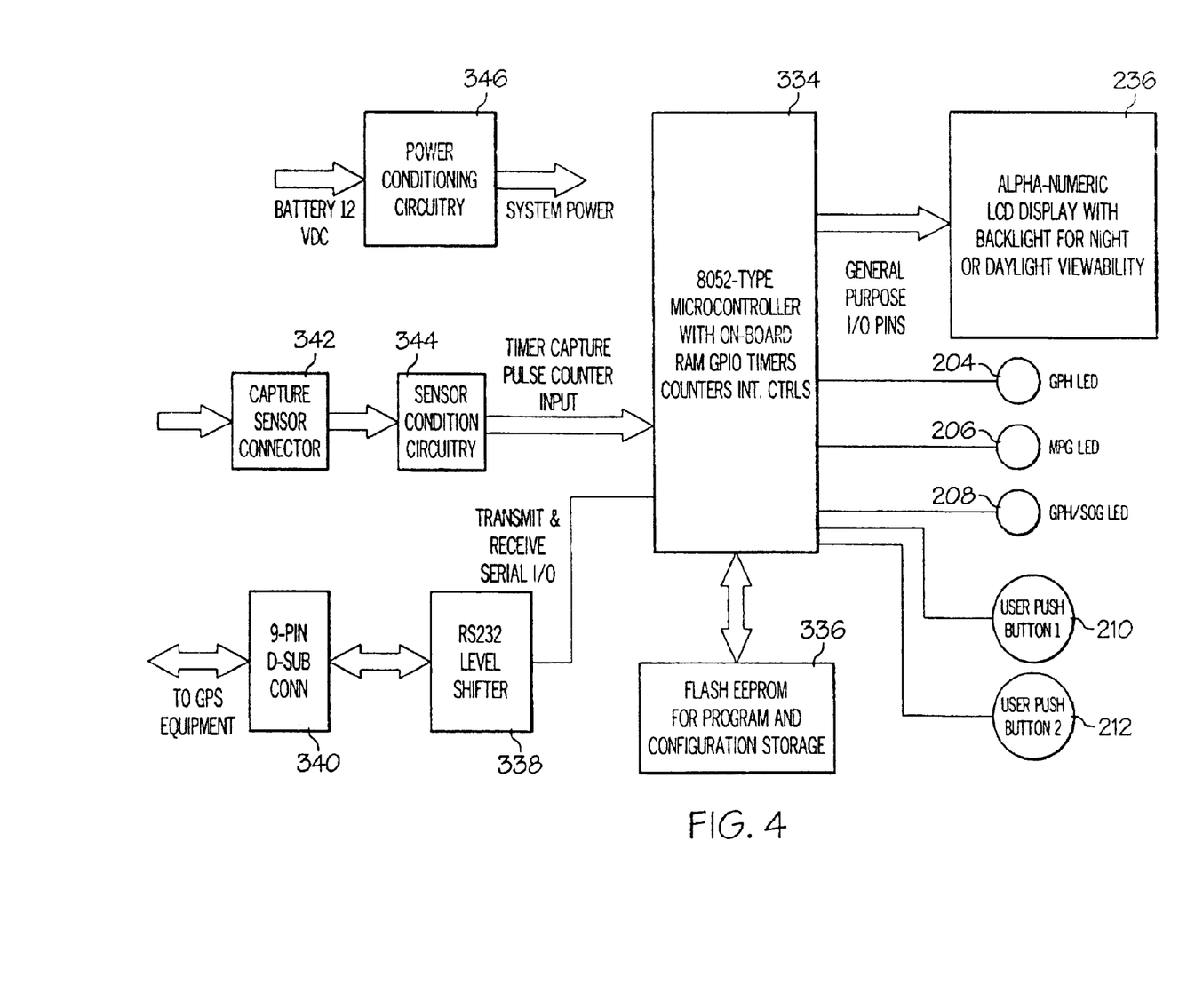
FIG. 4 contains a more detailed functional block diagram of the system of the invention.

FIG. 4 contains a more detailed functional block diagram of the system of the invention. The processor 34 can be, for example, an 8052-type microcontroller 334. It will be understood that various microprocessors and microcontrollers may be used. The display 236 can include a backlit LCD for night visibility. The processor interfaces with a flash EEPROM 336 for program and configuration storage. The GPS receiver interfaces through a 9-pin connector 340 to a RS232 level shifter 338. The sensor interfaces through a sensor connector 342 and sensor conditioning circuitry 344. The system can operate from standard 12 VDC boat battery power via battery conditioning circuitry 346.

The fuel consumption computation system of the invention is a non-invasive technology. The volume and rate of fuel consumed by the outboard engine is measured indirectly. The technology does not use direct contact of, or invade the flow of fuel from the fuel supply tank, through the fuel line connecting to the outboard engine. As a result, the system has no impact on engine performance and provides an extremely accurate determination with regard to fuel consumption.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A fuel meter for determining a parameter related to fuel consumption in an engine, comprising:
    a controller electrically coupled to the engine, the controller generating an electrical control signal that controls fuel introduced into the engine;
    a sensor coupled to the controller for sensing the electrical control signal, the sensor detecting an electrical parameter of the electrical control signal and, using the detected electrical parameter of the electrical control signal, generating from the electrical control signal an electrical measurement signal indicative of the electrical parameter of the electrical control signal; and
    a processor that receives the electrical measurement signal and uses the electrical measurement signal to determine the parameter related to fuel consumption in the engine.

2. The fuel meter of claim 1, wherein the sensor comprises an electrical sensor.

3. The fuel meter of claim 2, wherein the sensor is inductively coupled to a line carrying the control signal.

4. The fuel meter of claim 2, wherein the sensor is conductively coupled to a line carrying the control signal.

5. The fuel meter of claim 1, wherein the engine is an outboard engine.

6. The fuel meter of claim 1, wherein the electrical parameter is frequency of the electrical control signal used to control fuel introduced into the engine.

7. The fuel meter of claim 6, wherein the processor uses volume of a fuel injector to determine the parameter related to fuel consumption in the engine.

8. The fuel meter of claim 1, wherein the electrical parameter is voltage of the electrical control signal used to control fuel introduced into the engine.

9. The fuel meter of claim 8, wherein the processor uses volume of a fuel injector to determine the parameter related to fuel consumption in the engine.

10. The fuel meter of claim 1, wherein the electrical control signal controls a valve used to introduce fuel into the engine.

11. The fuel meter of claim 1, wherein the electrical control signal controls a fuel injector used to introduce fuel into the engine.

12. The fuel meter of claim 11, wherein the processor uses volume of a fuel injector to determine the parameter related to fuel consumption in the engine.

13. The fuel meter of claim 1, wherein the parameter related to fuel consumption in the engine is volume of fuel consumed.

14. The fuel meter of claim 1, wherein the parameter related to fuel consumption in the engine is rate of fuel consumption.

15. The fuel meter of claim 1, wherein the parameter related to fuel consumption in the engine is fuel efficiency.

16. The fuel meter of claim 1, wherein the measurement signal is generated independent of a measurement of engine rotations per minute (RPM).

17. The fuel meter of claim 1, further comprising a GPS receiver used in determining velocity of a boat propelled by the engine.

18. The fuel meter of claim 1, further comprising a velocity meter for determining velocity of a boat propelled by the engine.

19. The fuel meter of claim 1, wherein velocity of a boat propelled by the engine is used in determining the parameter related to fuel consumption in the engine.

20. The fuel meter of claim 1, wherein the processor is an integral part of an engine controller used to control the engine.

21. The fuel meter of claim 1, wherein the processor is an integral part of an engine controller used to generate the electrical control signal.

22. A method for determining a parameter related to fuel consumption in an engine, comprising:
    electrically coupling a controller to the engine;
    with the controller, generating an electrical control signal that controls fuel introduced into the engine;

coupling a sensor to the controller;

with the sensor, sensing the electrical control signal with the sensor, detecting an electrical parameter of the electrical control signal;

with the sensor, using the detected electrical parameter of the electrical control signal to generate from the electrical control signal an electrical measurement signal indicative of the electrical parameter of the electrical control signal; and receiving the electrical measurement signal and using the electrical measurement signal to determine the parameter related to fuel consumption in the engine.

23. The method of claim 22, wherein the electrical control signal is sensed by an electrical sensor.

24. The method of claim 23, further comprising inductively coupling the sensor to a line carrying the control signal.

25. The method of claim 23, further comprising conductively coupling the sensor to a line carrying the control signal.

26. The method of claim 22, wherein the engine is an outboard engine.

27. The method of claim 22, wherein the electrical parameter is frequency of the electrical control signal used to control fuel introduced into the engine.

28. The method of claim 27, wherein the processor uses volume of a fuel injector to determine the parameter related to fuel consumption in the engine.

29. The method of claim 22, wherein the electrical parameter is voltage of the electrical control signal used to control fuel introduced into the engine.

30. The method of claim 29, wherein volume of a fuel injector is used to determine the parameter related to fuel consumption in the engine.

31. The method of claim 22, wherein the electrical control signal controls a valve used to introduce fuel into the engine.

32. The method of claim 22, wherein the electrical control signal controls a fuel injector used to introduce fuel into the engine.

33. The method of claim 22, wherein the processor uses volume of a fuel injector to determine the parameter related to fuel consumption in the engine.

34. The method of claim 22, wherein the parameter related to fuel consumption in the engine is volume of fuel consumed.

35. The method of claim 22, wherein the parameter related to fuel consumption in the engine is rate of fuel consumption.

36. The method of claim 22, wherein the parameter related to fuel consumption in the engine is fuel efficiency.

37. The method of claim 22, wherein the measurement signal is generated independent of a measurement of engine rotations per minute (RPM).

38. The method of claim 22, wherein velocity of a boat propelled by the engine is used in determining the parameter related to fuel consumption in the engine.

39. The method of claim 38, wherein a GPS receiver is used in determining velocity of the boat propelled by the engine.

40. The method of claim 38, wherein a velocity meter is used in determining velocity of the boat propelled by the engine.

41. The method of claim 22, wherein the parameter related to fuel consumption in the engine is determined by an engine controller used to control the engine.

42. The method of claim 22, wherein the parameter related to fuel consumption in the engine is determined by an engine controller used to generate the electrical control signal.

* * * * *

UNITED STATES PATENT AND TRADEMARK OFFICE
CERTIFICATE OF CORRECTION

PATENT NO. : 6,880,390 B2
DATED : April 19, 2005
INVENTOR(S) : Nicholas J. Emord It is certified that error appears in the above-identified patent and that said Letters Patent is hereby corrected as shown below:

Column 9,
Line 2, after "control signal", please add -- ; --.

Signed and Sealed this

Sixteenth Day of August, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,880,390 B2 |
| APPLICATION NO. | : 10/289631 |
| DATED | : April 19, 2005 |
| INVENTOR(S) | : Nicholas J. Emord |

It is certified that error appears in the above-identified patent and that said Letters Patent is hereby corrected as shown below:

On the Title Page, Item (73) Assignee, please delete "Bell Sea Marine Systems, Hingham, MA (US)" and insert -- NSM, LLC, Hingham, MA (US) --.

Signed and Sealed this

Sixteenth Day of December, 2008

JON W. DUDAS
*Director of the United States Patent and Trademark Office*